April 8, 1952 R. L. LINFORTH ET AL 2,592,049
AIRCRAFT HEATING SYSTEM
Filed Dec. 10, 1946 4 Sheets-Sheet 2

INVENTORS
SIGURD DANIEL HAGE
ROBERT L. LINFORTH
BY Reynolds & Beach
ATTORNEYS

INVENTORS
SIGURD DANIEL HAGE
BY ROBERT L. LINFORTH

Reynolds Beach
ATTORNEYS

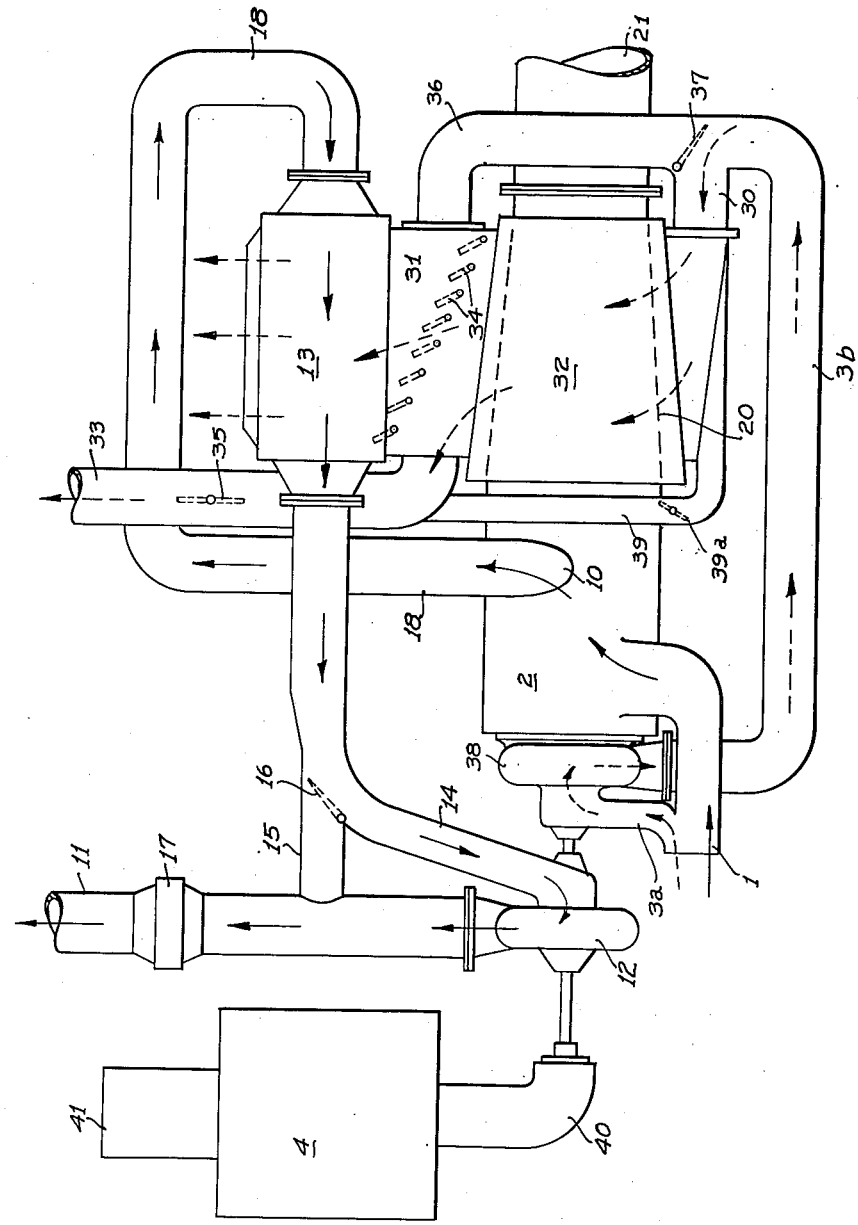

Patented Apr. 8, 1952

2,592,049

UNITED STATES PATENT OFFICE 2,592,049

AIRCRAFT HEATING SYSTEM

Robert L. Linforth and Sigurd Daniel Hage, Seattle, Wash., assignors to Boeing Airplane Company, a corporation of Delaware Application December 10, 1946, Serial No. 715,288

20 Claims. (Cl. 257—9)

The heating of an aircraft is usually considered exclusively in connection with regulation of passenger space temperature, to maintain the same within a comfort range in the vicinity of 70° F., or sometimes exclusively in connection with the supply of heat for anti-icing purposes to those airfoil surfaces whereon ice is most likely to form. Seldom are these two purposes considered as different phases of a coordinated, unitary problem, and usually each is separately attacked as an individual problem, for each of which a separate heating system is provided, operable wholly independently of the other such system. This involves duplication of equipment and added weight, each of which is undesirable. Actually, these two problems can be attacked as coordinate branches of a single problem, and because of the phase relationship of the peak loads in each phase, it is possible to provide, as is the primary aim of this invention, one unitary system capable of handling either peak load, but, because of their phase relationship, of less capacity, weight, and complexity than would be required to handle either problem or branch thereof separately.

In such a system, especially for installation in a pressurized cabin airplane, consideration must be given to the heating effect which accompanies pressurization, or which arises from warm climatic conditions, radiation, or the like. Indeed, where increased temperature is required, by taking advantage of the pressure-induced heat, and as well, of the heat generated in the prime mover and compresor wherein, by expenditure of energy, compression is produced, a portion of the otherwise wasted heat can be put to use. Contrariwise, where external heat causes an uncomfortable temperature rise, the pressurizing system necessarily employed may become the means for cooling—supplying negative heat to—the cabin. By so coordinating the system in all its parts, and by relating it to other systems necessarily provided for related purposes, the minimum in weight, complexity, and fuel consumption can be achieved with a maximum of efficiency and range of capability.

As has been stated, the regulation of heat in a modern aircraft involves two primary considerations. One of these is the heating of the cabin or similar occupied space, which must be kept within a comfortable range of temperatures throughout a wide range of ambient temperatures, ranging from perhaps plus 180° F. to minus 65° F., and during pressurization at values which vary with altitude. The cabin temperature should be kept at a substantially constant value, say 70° F., at ambient temperatures below that value, as modified by pressurization of the cabin, but at higher ambient temperatures the cabin air temperature should at least be lower than ambient temperature, and the inflowing cabin air must be very appreciably below ambient temperature. The second consideration is to supply a sufficient volume of air at sufficiently elevated temperatures to heat such airfoil surfaces as are subject to icing, during the icing range of ambient temperatures, and thereby to preclude the formation of ice upon such airfoil surfaces. Anti-icing requirements, indeed, take precedence over cabin heating requirements, since anti-icing relates to the safety of the aircraft, and cabin heating to mere comfort, but still it is desirable to accommodate both adequately.

An appreciable volume of freshly intaken air, and, therefore, a large heating capacity, is necessary for the supply of fresh air to the passenger cabin of such an airplane. Also, because those portions of the airfoil surfaces which are to be protected from icing are of large extent, and are directly exposed to ambient temperatures, there is likewise required a large volume of air heated to adequate temperatures to prevent icing during subjection to the temperature range within which icing is probable. To provide separate heating systems, each of capacity adequate to the separate maximum demands, would involve space utilization, added weight, and fuel consumption materially in excess of what can well be spared for such purposes.

Fortunately, the icing range of temperatures is relatively narrow, from perhaps plus 35° F. to 0° F. Below 0° F. the probability of icing is negligible. Advantage can be taken of this fact to combine into one unit the cabin heating and the anti-icing heating systems, in such manner that each contributes to the heating (positive or negative) of the other during ambient temperature ranges when the assisting system is not wholly required for its primary purpose, yet each is adequate for its primary purpose during temperature ranges such as preclude assistance from the other system. Each such system, during a portion of the range of its heating, contributes to the heating of the system which most requires heating assistance during that range, yet without producing any deficiency in the heating in either such system in any part of its total range. Thereby may be achieved the primary object of our invention, which is to provide a single or unitary heating system for an aircraft, of minimum bulk and weight, yet with adequate capacity for all necessary purposes.

Since the maximum heating capacity of such a combined system may be quite high, and since there will be occasions where the ambient temperature is uncomfortably high, and the radiant heating effect on cabin surfaces is large, and the cabin temperature is correspondingly high, it is a further object in such a system to provide means for regulating the temperatures (particularly the cabin air temperature), and when the occasion demands, to cool the cabin air, that is to say, to heat it negatively, without employing a separate refrigerating system, so that regardless of elevated ambient temperature, and regardless of whether the aircraft is airborne or groundborne, the cabin air temperature will be maintained at a comfortable, substantially constant value.

Furthermore, since the heating demands of the airfoil anti-icing system and of the cabin air system will vary, but not in constant phase relationship to one another throughout the possible range of ambient temperatures, it is a further object to provide means for so regulating the extent of heating and the interchange of heat between the independent air flows themselves, and between each air flow and its individual heating means, as to maintain each such air flow at a reasonable and proper temperature, within the maximum heat output of the combined system, during such times as the maximum heat output is not required.

It is not safe under all circumstances, nor desirable, to permit the temperature of the anti-icing air to exceed a reasonably low maximum—perhaps 330° F., whatever may be the ambient temperature, and yet since the system must have sufficient capacity to maintain an anti-icing air-flow of such temperature down to the lower limit of anti-icing—0° F.— it is obvious that under higher ambient temperatures the anti-icing air-flow to the airfoils might at times exceed the selected maximum. Accordingly, it is a further object of this invention to provide means for regulation of the temperature of the anti-icing air flowing to the airfoil surfaces, and in particular means by which the exceeding of the selected maximum will be prevented under all conditions.

It is also an object to provide such regulating means, including cooling means, which are susceptible of ready control, and if need be, of control by thermostatic or automatic or temperature-responsive means. However, the manner in which the control means are operated does not of itself constitute part of the present invention.

In the present invention advantage is taken of the heat of compression in a cabin pressure system, which may be rather appreciable at the higher altitudes where the ambient temperatures are normally low, and which conversely may be lower at lower altitudes and higher normal ambient temperatures, to supply an appreciable part of the heat necessary to satisfy cabin heating requirements. Such a compressor must be driven, and it has been found most suitable to employ a prime mover for this particular purpose. If such prime mover be a fuel-consuming turbine which includes a compressor section to supply air to its combustion section, the cabin air may be bled therefrom. Any other suitable prime mover may be employed, however, and furthermore, the air under pressure may be supplied by a separate compressor driven by any such prime mover. Since an appreciable amount of heat is developed in a fuel-consuming prime mover, other than in its compressor section, advantage may also be taken of this, and the same is utilized, for further assisting in supplying the total heat requirements of the system.

Moreover, since such a prime mover must have adequate capacity for maximum demand, there is available at all other times excess power, and it is another object of the invention to take advantage of the excess power, which might otherwise be wasted, to supply normal electrical demands of the airplane, and thus to achieve in even greater measure the primary aim, of maximum utility with minimum bulk and weight.

Further objects, and particularly such as relate more particularly to structural arrangements and details, can be ascertained as this specification progresses.

In the accompanying drawings the invention has been shown in one form, selected for illustration, under different conditions of operation, and also in several other forms. All showings are diagrammatic in nature, since the mechanical forms of the various elements are either conventional or immaterial, and the invention is concerned primarily with the manner of assembling and arranging the parts and their relationships to one another and to the system as a whole.

Where the context or construction requires, or will so permit, references made herein to a heating system should be treated as embracing cooling as well where the apparatus is so adapted as described, for cooling is but negative heating, and is so to be regarded herein, as the context may require or permit.

Figure 6 is a modified form closely related to the form of Figure 1.

Reduced to simplest terms, the heating regulating unit of this invention consists of two non-communicating conduits, crossed however for heat interchange. Through one of these conduits is conveyed air for supplying the cabin, and this air is heated, as by a compressor in the conduit located in advance of the crossing of the two conduits, but this compressor has capacity only sufficient to heat the cabin adequately when the intaken ambient air is at or above a temperature, say 0° F., still materially above the lowest ambient temperature likely to be encountered, which may be minus 65° F. The other conduit supplies air to the airfoil surfaces for anti-icing purposes, and it has in it, in advance of the crossing of the two conduits, a means which is organically connected to and dependent upon the compressor, and itself arranged to heat the air in this second conduit, the entire capacity of which heating means may be required for anti-icing purposes through the icing range of ambient temperatures, say from plus 35° F. down to 0° F, but part of which capacity is available for cabin heating below the icing range. Accordingly, this second conduit is branched in advance of the crossing of the two conduits, so that during the icing range, all the heated air flowing through the second conduit can be by-passed or diverted from the crossing, to be supplied directly to the airfoil surfaces for anti-icing. However, below the lower limit of icing (0° F.), the anti-icing air is no longer required for supply to the airfoil surfaces, and therefore, this anti-icing air may transmit its heat to the cabin air, by way of the heat interchange at the crossing of the two conduits, the interchange of heat between them being regulated to maintain the cabin air, down to a very low ambient temperature, at an adequate and comfortable level. Under such conditions the heat is supplied to the cabin air in part by the heat developed by the heating means and delivered by the air flowing through the second conduit, which is in heat-exchange relation at the crossing with the cabin air conduit and in part by the compressor which necessarily functions in conjunction with said heating means. Moreover, for cooling or negatively heating the cabin air when the ambient temperature is at such level, as other factors are operative in such manner as would increase the cabin air temperature to an uncomfortable degree, provision is made for interchange of temperature in the reverse direction; that is, to extract heat from the cabin-air flow and to dissipate that heat by way of the airflow through the second conduit. By regulation of the relative degree of heating and/or of cooling, the cabin air temperature can be maintained close to an optimum value under all ambient temperatures and conditions.

Figure 1:
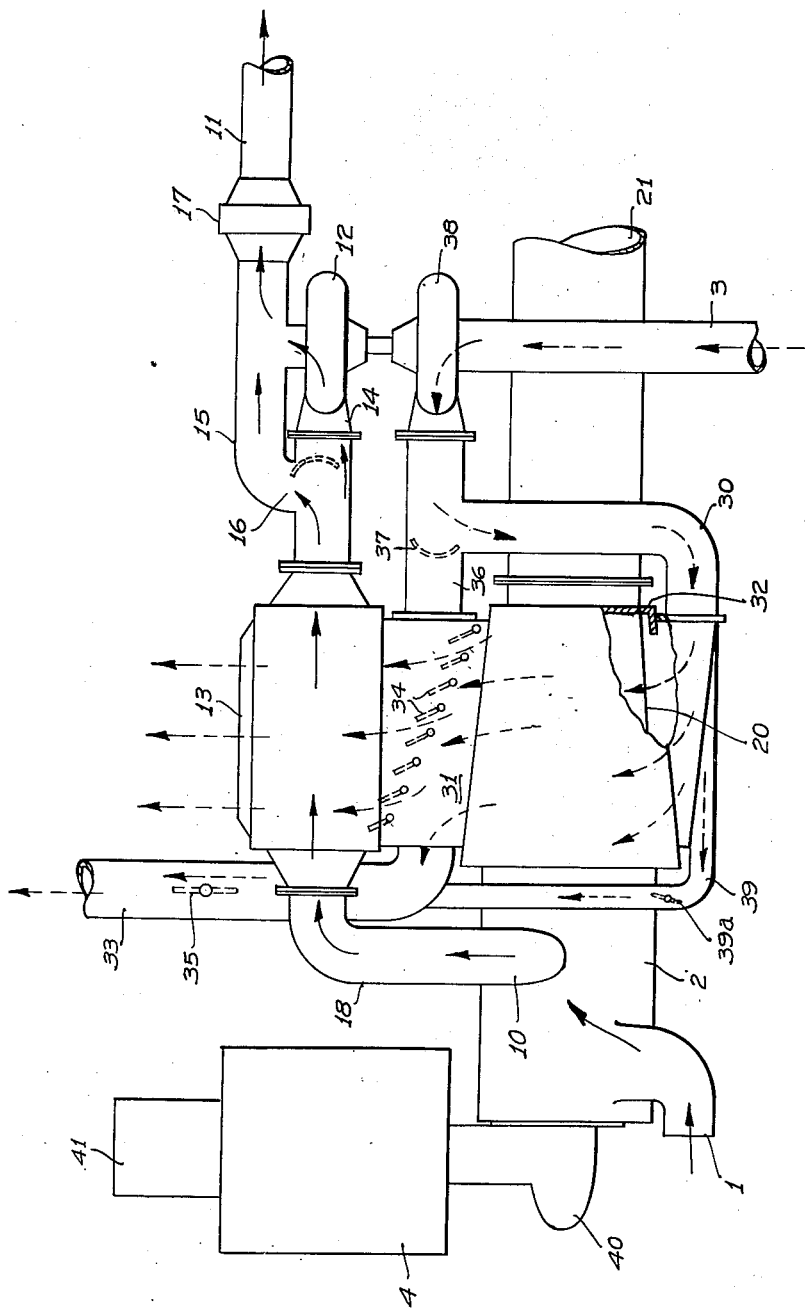
Figure 1 is a diagram of the selected illustrative form of the system showing the parts arranged for operation under anti-icing conditions.
Figure 2:
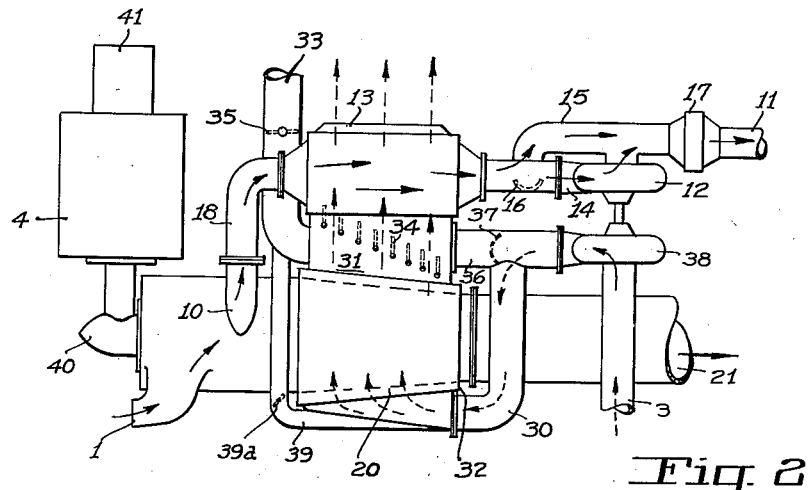
Figure 2 is a similar view showing parts arranged for maximum heating of the cabin.
Figure 3:
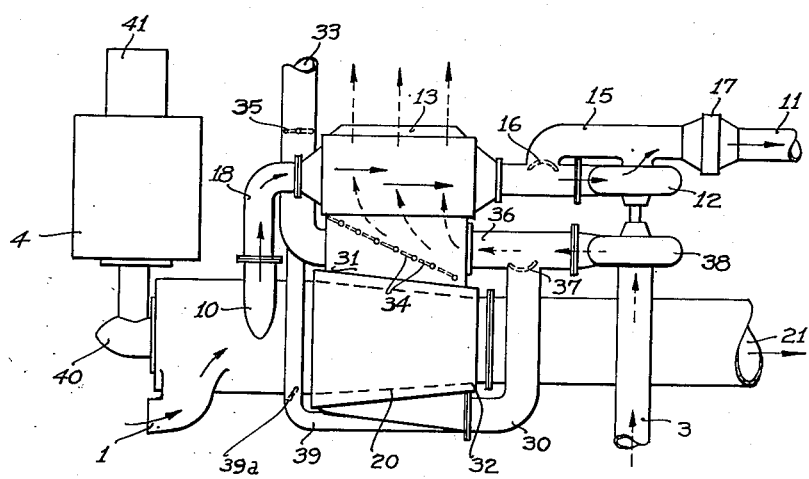
Figure 3 is a similar view showing parts arranged for maximum cooling of the cabin air.

Referring first to the arrangement shown in Figures 1, 2 and 3, the cabin-air conduit has an intake at 1 to the compressor section 2 of a fuel-consuming turbine prime mover. Alternatively, instead of employing the compressor section of such a prime mover turbine, such a prime mover may drive a separate compressor, which latter is included in the cabin-air conduit; see, for example, Figure 6, which will be discussed later in more detail. Assuming, however, that the compressor section of such a prime mover is employed, the cabin air is bled therefrom at an appropriate stage (as indicated at 10) and thence by way of a conduit portion 18 and a secondary heat exchanger 13 is led by an outlet 11 towards the cabin. Intermediate the secondary heat exchanger 13 and the outlet at 11 is an expansion turbine 12 arranged in a by-pass 14 around the main conduit portion 15. A valve 16 regulates flow alternatively directed through the expansion turbine 12 or directly through the main conduit portion 15 to the outlet at 11, or the ratio of flow by way of one such path to flow by way of the other such path, the flows recombining before reaching outlet 11. A filter at 17 may also be included, and there may be, as part of the filter, or elsewhere in this portion of the cabin air conduit—that is, in the portion beyond the expansion turbine 12—provision for removing water of condensation, but such means, being conventional, are not herein shown.

The inlet at 1 to the cabin air conduit may be a ram opening forwardly in the direction of flight and projecting into the air stream, or means such as a blower may be provided for delivering air into the inlet at 1. Moreover, air may be bled from this cabin-air conduit within the portion 18 intermediate the compressor outlet 10 and the secondary heat exchanger 13, or beyond the heat exchanger, for delivery to the engine which propels the aircraft.

The second conduit has an inlet 3 to which air may be delivered in any such fashion as those discussed in connection with the inlet at 1. This second conduit has a section 30 which leads to a jacket 32 surrounding the combustion section 20 of the prime mover. The compressor section 2 feeds into the combustion section 20 of this prime mover, and the exhaust pipe 21 carries the exhaust gases from the prime mover for discharge overboard.

The air in this second conduit is very appreciably heated in passing through the packet 32, which thus constitutes a primary heat exchanger. Beyond this jacket, however, the conduit is branched, and for this purpose may be delivered into a diversion chest 31, which is connected for delivery alternatively through the secondary heat exchanger 13 for transmission by heat exchange to cabin air crossing it within this secondary heat exchanger, or by way of the branch 33 to the airfoil surfaces which are to be warmed for prevention of icing. Whether the heated air passing through this second conduit is delivered to the secondary heat exchanger 13, or by way of the outlet 33 to the airfoil surfaces, or in what proportion it is delivered to each, is determined by louvers or valve means 34 within the diversion chest 31, and to a certain extent, by valve means 35 arranged in the airfoil branch 33.

It will be noted that there is a bypass 36, controlled by a valve 37, by which air from the inlet 3 may be delivered directly to the diversion chest 31 without passing through the primary heat exchanger 32, instead of by the normal course, which is through the primary heat exchanger. It will be noted, too, that there is a blower 38 in this second conduit which is operatively connected to be driven by the expansion turbine 12 in the cabin-air conduit.

Additionally, it is desirable to provide a bypass 39, controlled by a valve 39a, by means of which some selected part of the air in the second conduit may by-pass the primary heat exchanger, while the remainder of the air in this second conduit is passing therethrough. The bypass 39 connects into the outlet 33 of the second conduit.

To complete the installation the prime mover, by a suitable drive connection indicated at 40, is arranged to drive a direct current generator 4 and an alternator 41 which are intended to supply the normal electrical requirements of the aircraft. Suitable controls may be provided so that these electrical devices are driven only when the demands on the prime mover arising from the heating unit are less than the maximum capacity of the prime mover.

Figure 1 shows the parts arranged for anti-icing. Under anti-icing conditions, where the temperature range of the ambient air is between perhaps plus 35° F. to 0° F., the means for heating the cabin-air flow, namely the compressor 2, may of itself have adequate capacity, and may require no assistance, but normally it will be possible to afford some assistance to heat the cabin air from the second or anti-icing airflow, though under such conditions the greater part of the heat supplied to the anti-icing airflow through the second conduit is employed for anti-icing purposes. Accordingly, it will be seen in Figure 1 that the valve means at 34 are partly open, but are sufficiently closed that the air entering the second conduit at 3, moved along by the blower 38 and passed by way of the portion 30 to the primary heat exchanger 32 and thence to the diversion chest 31, is diverted to the airfoil outlet 33. A small portion, however, is permitted to pass through the valve means 34 and thence to the branch which includes the secondary heat exchanger 13. This latter portion assists in heating the cabin-air flow which enters at 1, is heated by the compressor at 2, passes by the section 16 to the secondary heat exchanger, and thence is delivered mostly by the direct passage 15 but in part through the expansion turbine 12 to the outlet 11 for delivery to the cabin. Only sufficient is delivered to the expansion turbine 12 to provide a drive for the blower 38, since any work done by the cabin-air flow at this point is reflected in a reduction of the temperature of this cabin-air flow, which under the assumed conditions (icing range of ambient temperature) is undesirable.

It may not be required at all temperatures within the icing range that the entire volume of air in the second conduit be passed through the primary heat exchanger 32, and, therefore, for regulation of the temperature of the air delivered to the airfoil surfaces, the bypass 39 is provided. By regulation of its valve 39a some portion of the air may bypass the primary heat exchanger and be delivered directly to the airfoil outlet at 33. By proper regulation of the amount of air thus bypassed with relation to the amount which passes through the primary heat exchanger, the temperature of the air delivered to the airfoil surfaces may be nicely regulated and kept below a reasonably low maximum, perhaps 330° F. At such temperature there is no fire hazard created should gasoline fumes be encountered within the airfoil surfaces where this anti-icing air is discharged.

When the ambient temperatures are below 0° F., and down, for instance, to minus 65° or minus 70° F., the cabin air requires the input of more heat that can be obtained from the heat of compression in the compressor 2. Whereas under anti-icing conditions, some assistance in heating the cabin air is rendered by a small proportion of the air in the second conduit, under maximum heating conditions, since no heat is required for anti-icing purposes, all the heat in the airflow through the second conduit may be employed to assist in heating the cabin air, or such proportion thereof as may be necessary. To that end the valve means at 34 may be opened wide and the valve means at 35, to outlet 33, at 37 to bypass 36, and at 39a may be closed, as they are shown in Figure 2. Now all the air in the second conduit is passed through the primary heat exchanger 32 and delivered thence by way of the diversion chest 31 to that branch of the second conduit which includes the secondary heat exchanger 13. Therein, through heat exchange, this heat (within the range of the efficiency of this secondary heat exchanger) is delivered to the cabin air passing through the cabin air conduit. The heat of compression plus the heat thus supplied from the second conduit will adequately heat the cabin air, down to ambient temperatures, in a particular installation and design, of minus 65° F. At that ambient temperature the cabin air temperature in this particular installation will be maintained at plus 70° F. Neither heating means, that in the cabin-air conduit nor that in the second conduit, could alone supply sufficient heat to maintain such a cabin air temperature.

At times the aircraft may be required to operate under conditions such that the ambient temperature is above the desired cabin air temperature. Also, under such conditions the radiant heating effect upon the cabin surfaces will tend to increase the cabin air temperature. However, under such conditions obviously there is no danger of icing the airfoil surfaces. It is possible under such conditions to cut the primary heat exchanger 32 out of the system, by locating the valve 37 as shown in Figure 3, so that all air in the second conduit goes by way of the bypass 36 directly into the diversion chest 31 and thence through the secondary heat exchanger 13. This air, since it is taken in from the outside, is at a temperature in the vicinity of ambient temperature, though perhaps at a somewhat higher temperature by reason of the action of the blower 38. However, it is at a lower temperature than the cabin air intaken at 1 and, passed through the compressor at 2, and, consequently, the air in this second conduit cools the cabin air somewhat as the latter passes through the secondary heat exchanger 13. Moreover, under such conditions the valve 16 is set, as it is shown in Figure 3, to direct all the cabin air through the expansion turbine 12. In passing through this expansion turbine, this air does work upon that turbine, and thereby is reduced materially in temperature, to such a degree, indeed, that the air passing to the cabin at 11 may be reduced, in a particular installation under consideration, to a temperature in the neighborhood of plus 34° F. Air at such a temperature, delivered to the cabin, will maintain it comfortably cool. Obviously by proper regulation of the valves, particularly that at 16, the degree of cooling of the air in the cabin air conduit may be properly regulated to keep the cabin air temperature at a level which is at least lower than ambient temperature, and preferably at a substantially constant value in the neighborhood of plus 70° F.

Figure 4:
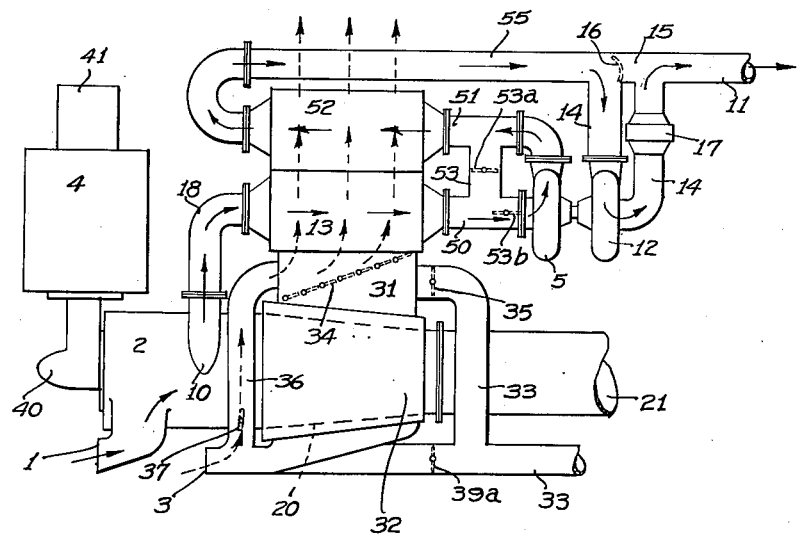
Figure 4 is a similar diagram showing a modified arrangement of the parts.

The arrangement shown in Figure 4 is in principle the same as that already described. The parts are somewhat differently arranged, but the same numerals are applied to devices serving the same purpose as in the form previously described. The anti-icing air conduit lacks any circulating blower, such as 38, and the cabin-air conduit is somewhat modified, beyond the secondary heat exchanger 13. Leaving this secondary heat exchanger, the cabin air passes by an outlet 50 to a booster blower 5, which takes the place of the blower 38 in that it is connected to be driven by the expansion turbine 12, and thence the cabin air passes to an inlet 51 to an intercooler 52, or, depending upon the position of the valves 53a and 53b, the cabin air leaving the secondary heat exchanger 13 passes by way of a by-pass 53 directly to the inlet 51, but avoiding the booster blower 5. In the intercooler 52 it is once more crossed with this branch of the second conduit, in heat exchange relation therewith, and passes thence by way of the section 55 to the branch 14, or if the valve 16 does not block passage directly, then by way of the connection 15 to the outlet 11 towards the cabin.

Under anti-icing conditions, as before, substantially all the air in the second conduit is passed over or through the primary heat exchanger 32 and thence is delivered by way of 33 to the airfoil surfaces. None of this, or only a small portion, is permitted to pass through the heat exchanger 13 and intercooler 52 to modify the temperature of the cabin air in the cabin-air conduit. However, the compressor 2 has adequate capacity to maintain cabin temperature at the desired level during icing conditions.

Under maximum heating conditions, as in the previous form, flow to the airfoil outlet at 33 is cut off by control of the valves 35 and 39a, and by opening the valve means at 34 all the air in the second conduit is passed first through the primary heat exchanger 32 and thence through the secondary heat exchanger 13 and the intercooler 52, to be discharged overboard, but in thus passing through the secondary heat exchanger and the intercooler, it modifies and assists in raising the temperature of the cabin air, passing through the cabin-air conduit.

Under maximum cooling conditions the intaken air at the secondary conduit inlet 3 is diverted, by closure of the valve means 34 and opening of the valve means 37, by way of the by-pass 36 to the diversion chest 31, and thence through the secondary heat exchanger 13 and the intercooler 52, where it assists in lowering the temperature of the cabin air. In addition, by closing the valve 53a and opening the valve 53b, the cabin air, which normally would go by way of the by-pass 53, is diverted to pass entirely through the booster blower 5, and later, the valve 16 being positioned to block direct passages by way of the expansion turbine 12. While the blower 5 adds some heat to the cabin air, this is in part extracted from it in the intercooler 52, but more particularly, any heat supplied by the blower 5 is only derived from energy supplied by the turbine 12 which drives the blower. Since the turbine abstracts energy from, and materially lowers the temperature of, the same cabin air, to a far greater degree than the blower produces any opposite result, the net result is that energy in the form of heat is abstracted from the cabin air, and the air is finally delivered at the outlet 11 adequately cooled.

Figure 5:
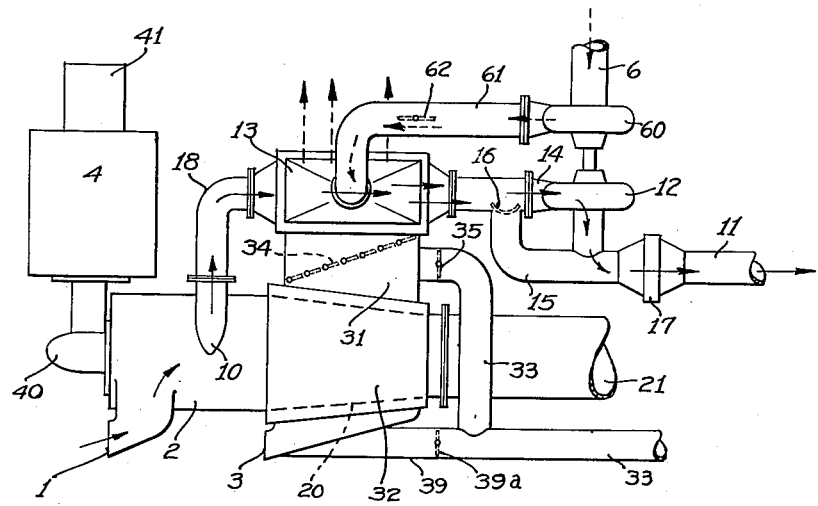
Figure 5 shows a further modified form.

The arrangement of Figure 5 differs from the other two arrangements, and especially from the arrangement of Figures 1, 2 and 3, primarily in that the air which is intended to assist in cooling the cabin air is intaken through a ram inlet which is separate from the inlet 3 by which the anti-icing air enters. This further inlet permits air to enter by way of the conduit 6, where it is driven by a blower 60, and then passes by way of the conduit 61, so long as the valve 62 is open, to and through the secondary heat exchanger 13 and then overboard. The blower 60 is arranged in the same fashion as was the blower 38 in the form of Figures 1, 2, and 3, to be driven by the expansion turbine 12. By choking air flow in the conduit 61, the turbine 12 may be loaded to an appreciable degree, to absorb a large amount of heat from the cabin air, when required to do so.

Under anti-icing conditions the valve 62 is closed off, and hence inlet by way of the conduit 6 is prevented. The valve 16 is so set that the cabin air is not required to pass through the expansion turbine 12, but by-passes the same by way of the conduit 15. The cabin air then is taken in at 1, heated in the compressor section 2, and while it passes through the heat exchanger it does not gain nor lose heat, so long as the valve means at 34 is closed, and this cabin air then passes on to the cabin, heated by the heat of compression. Naturally if it is desired to cool down the cabin air somewhat, some air may be admitted by way of the conduit 6, 61, and through the secondary heat exchanger 13. Anti-icing air enters at 3, is warmed in the primary heat exchanger 32, and then is passed by way of the outlet 33 to the airfoil surfaces, being tempered to the necessary degree by air by-passed through the by-pass 39.

Under maximum heating conditions, since anti-icing is no longer required, the valves 35 and 39a are closed, and the valve means at 34 is opened, but the valve at 62 remains closed. Air intaken at 3 passes through the primary heat exchanger 32, then directly through the secondary heat exchanger 13, and overboard, and in passing through the secondary heat exchanger it gives up a large part of its heat to the crossing cabin air, which follows substantially the same path as just explained in connection with anti-icing conditions.

When cabin cooling is required, the louvers 34 may be closed, completely or to such extent as is necessary, and indeed, by closing the valve 35 and leaving the valve 39a open air intaken at 3 may be by-passed around the primary heat exchanger and directly to the outlet at 33. However, the cabin air, warmed by compression and passing through the secondary heat exchanger 13, is cooled by air intaken at 6, and delivered to the secondary heat exchanger, crossing the cabin air, by way of the conduit 61. The cabin air is further cooled by being required, by closure of the valve 16, cutting off the passage 15, to pass through the expansion turbine 12, which, by driving the more or less highly loaded blower 60, absorbs energy and cools the cabin air. The operation of the blower 60 does not greatly increase the temperature of air from conduit 6 because such air is not compressed appreciably by the blower so that its temperature is still considerably lower than the cabin air temperature in the heat exchanger 13, which is more greatly compressed.

The form shown in Figure 6 is closely related in principle to that of Figure 1. It may be found preferable, and somewhat more practical, to employ a power-driven blower for moving the air through one or both of the conduits. The form of Figure 6 incorporates such an arrangement, and, in so doing, this form provides a wide range of variation of the loading of an expansion turbine in the cabin-air conduit, so that a large amount of energy derived from the passing cabin air may be required to rotate this turbine, and thereby a large amount of energy, and consequently, of heat, can be abstracted from the cabin airflow, if need be.

In the form of this Figure 6 the air is intaken to the cabin-air conduit at 1, as heretofore, but likewise air may be intaken to the second conduit at the same intake point. The anti-icing airflow, then, branches from the intake at 1 by way of the branch 3a, where it enters the blower 38, which is power-driven from the prime mover 20. The air is delivered thence by way of the conduit 3b to a point where it branches at 30 for passage through the primary heat exchanger 32, or by way of the by-pass 36 direct to the diversion chest 31. Cabin air, in this instance, is admitted to the compressor section 2, or it might be admitted to a separate blower driven therefrom, and passes, as before, by way of the conduit 18 through the secondary heat exchanger 13, and thence by way of the direct passage 15 or the branch 14, eventually to the cabin inlet at 11.

If the cabin air passes by way of the branch 14 it goes through the expansion turbine 12, and is cooled thereby. This expansion turbine 12 is secured on the same shaft as that which drives the blower 38, and which drives the generator 4 and alternator 41. As a result, by reduction of other motive power delivered to such shaft, the expansion turbine 12 may, if desired, be very highly loaded against the resistance of these other elements, and by thus highly loading it, a very large proportion of the heat of the passing air may be abstracted from it before the air is delivered to the cabin inlet at 11. The operation under anti-icing and under maximum heating conditions is substantially the same as those described in conjunction with the description of Figure 1.

We claim as our invention:

1. A heating unit for aircraft comprising a compressor and conduit means for intake of air thereto and delivery of such air after compression towards the cabin, a fuel consuming prime mover operatively connected to drive said compressor, and jacketed to constitute a primary heat exchanger, a secondary heat exchanger interposed in said conduit means between the compressor and the cabin, branched conduit means separate from said first conduit means, for leading heated air from said primary heat exchanger towards airfoil surfaces for anti-icing, and through said secondary heat exchanger for modification of the temperature of air in said first conduit means on its way to the cabin, means adjustable to govern the ratio of air delivered from the primary heater through the anti-icing and cabin-modifying branches of said second conduit means, and means to admit and advance air to and through said second conduit means.

2. A heat regulating unit for aircraft comprising a compressor and conduit means for intake of air thereto and delivery of such air after compression towards the cabin, a fuel consuming prime mover operatively connected to drive said compressor, and jacketed to constitute a primary heat exchanger, a secondary heat exchanger interposed in said conduit means between the compressor and the cabin, branched conduit means separate from said first conduit means, for leading heated air from said primary heat exchanger towards airfoil surfaces for anti-icing, and through said secondary heat exchanger for modification of the temperature of air in said first conduit means on its way to the cabin, means adjustable to govern the ratio of air delivered from the primary heater through the anti-icing and cabin-modifying branches of said second conduit means, said second conduit means including an intake portion, and blower means to advance intaken air through said second conduit means.

3. A heat regulating unit for aircraft as in claim 2, including an expansion turbine operatively connected to drive the blower for advancement of the air through the second conduit means, and itself connected in the first or cabin-air conduit means to be driven by that air on its way to the cabin, and thus to extract heat from the cabin air.

4. A heat regulating unit for aircraft as in claim 3, including a branch of said cabin-air conduit paralleling the main portion thereof, the expansion turbine being interposed in said parallel branch, and valve means movable to direct all or a portion of the cabin air through said turbine for driving the same, and likewise to vary the ratio of air thus cooled to uncooled cabin air.

5. A heating unit for aircraft comprising a compressor and conduit means for intake of air thereto and delivery of such air after compression towards the cabin, a fuel consuming prime mover operatively connected to drive said compressor, and jacketed to constitute a primary heat exchanger, a secondary heat exchanger interposed in said conduit means between the compressor and the cabin, branched conduit means separate from said first conduit means, for leading heated air from said primary heat exchanger towards airfoil surfaces for anti-icing, and through said secondary heat exchanger for modification of the temperature of air in said first conduit means on its way to the cabin, means adjustable to govern the ratio of air delivered from the primary heater through the anti-icing and cabin-modifying branches of said second conduit means, said second conduit means having a branched intake portion, of which one branch leads to, and the other branch by-passes, said primary heat exchanger, and valve means settable to determine by which branch the intaken air is delivered to said secondary heat exchanger.

6. A heating unit for aircraft comprising a compressor, first conduit means for intake of air thereto and delivery of such air after compression towards the cabin, a secondary heat exchanger in the delivery portion of said first conduit means, a fuel-consuming prime mover operatively connected to drive said compressor, and jacketed to constitute a primary heat exchanger, a second conduit means separate from said first conduit means, a blower to advance air therethrough from its intake, said second conduit means being connected to said primary heat exchanger, and including a diversion chest therebeyond, having two outlets, an anti-icing branch leading thence by one such outlet, the second outlet leading to said secondary heat exchanger, valve means adjustable to govern the ratio of air delivered from said diversion chest to the anti-icing branch and to the secondary heat exchanger, respectively, a by-pass in said second conduit means around said primary heat exchanger to said diversion chest, valve means to govern air flow through said by-pass or through the primary heat exchanger, and means to drive said blower.

7. A heat regulating unit for aircraft comprising a cabin-air conduit and a separate and branched second conduit, one such branch leading towards airfoil surfaces for anti-icing, a secondary heat exchanger arranged in heat exchange relation between the other such branch and said cabin-air conduit, heating means disposed in said cabin-air conduit, in advance of said secondary heat exchanger, for preliminarily heating the air moving in such conduit, and primary heating means disposed in heat exchange relation with said anti-icing branch conduit, in advance of said secondary heat exchanger, to heat air moving in such latter branch, and flow control means to regulate the ratio of heated air supplied, respectively, by way of the airfoil branch for anti-icing, and by way of the secondary heat exchanger to transmit heat to air moving through the cabin-air conduit, whereby selective utilization of the heat of said primary exchanger to heat the anti-icing surfaces and the cabin-air may be realized by said flow control means.

8. A heat regulating unit for aircraft as defined in claim 7, and means operable under the influence of air moving through the cabin-air conduit, beyond the secondary heat exchanger, to effect advance of air through the airfoil conduit, and in so doing to extract heat from the air as it moves through the cabin-air conduit.

9. A heat regulating unit for aircraft comprising a cabin-air conduit, a second conduit wholly separate from the cabin-air conduit, and including a delivery portion leading towards airfoil surfaces for anti-icing, said two conduits being crossed in mutual heat exchange relationship, and means in each conduit, in advance of such crossing, for modifying and regulating the temperature of the air passing therethrough and delivered to said crossing, for transmission of additional heat to or abstraction of excess heat from the cabin-air flow as required to maintain a comfortable cabin temperature at ambient temperatures below or above such value, and means in said second conduit operable to by-pass said crossing and to deliver all the heated air in such second conduit towards the airfoil surfaces during ambient temperatures within the icing range, or alternatively to deliver air in said second conduit to the crossing to supplement the heat in the cabin-air conduit at ambient temperatures below the icing range.

10. A heat regulating unit for aircraft comprising a compressor, first conduit means for intake of air thereto and delivery of such air after compression towards the cabin, a secondary heat exchanger in the delivery portion of said first conduit means, a fuel-consuming prime mover operatively connected to drive said compressor, and jacketed to constitute a primary heat exchanger, a second conduit means separate from said first conduit means, a blower to advance air therethrough from its intake, said second conduit means being connected to said primary heat exchanger, and including a diversion chest therebeyond, having two outlets, an anti-icing branch leading thence by one such outlet, the second outlet leading to said secondary heat exchanger, valve means adjustable to govern the ratio of air delivered from said diversion chest to the anti-icing branch and to the secondary heat exchanger, respectively, a by-pass in said second conduit means around said primary heat exchanger to said diversion chest, valve means to govern air flow through said by-pass or through the primary heat exchanger, an expansion turbine disposed in said cabin-air conduit means, and operatively connected to drive said blower and thereby to advance air through the second conduit means, and means to vary the ratio of cabin air delivered through or by-passing said expansion turbine.

11. A heat regulating unit for aircraft comprising a cabin-air conduit and an independent and branched second conduit, one such branch leading towards airfoil surfaces, a secondary heat exchanger arranged in heat exchange relation between the second such branch and the cabin-air conduit, a primary heat exchanger disposed in said second conduit in advance of its branch, means to advance air through said cabin-air conduit, means, including a blower in the second conduit and an expansion turbine in the cabin-air conduit operatively connected to drive said blower, for advancing air through said second conduit, and means to direct all or any desired portion of the air to either branch of said second conduit.

12. A heat regulating unit for aircraft comprising a cabin-air conduit and a separate and branched second conduit, one such branch leading towards airfoil surfaces, a secondary heat exchanger arranged in heat exchange relationship between the second such branch and the cabin-air conduit, a primary heat exchanger disposed in said second conduit in advance of its branch, means in each conduit for advancing air therethrough, means to direct all or any desired portion of the air to either branch of said second conduit, a by-pass in said second conduit around said primary heat exchanger leading directly to said secondary heat exchanger, and valve means to direct such unheated air either through the primary heat exchanger for heating, or directly to said secondary heat exchanger for cooling air moving through the cabin-air conduit.

13. A heat regulating unit for aircraft comprising a cabin-air conduit and a separate and branched second conduit, one such branch leading towards airfoil surfaces, a secondary heat exchanger arranged in heat exchange relationship between the second such branch and the cabin-air conduit, a primary heat exchanger disposed in said second conduit in advance of its branch, means in each conduit for advancing air therethrough, means to direct all or any desired portion of the air to either branch of said second conduit, a by-pass in said second conduit around said primary heat exchanger leading directly to said secondary heat exchanger, valve means to direct such unheated air either through the primary heat exchanger for heating, or directly to said secondary heat exchanger for cooling air moving through the cabin-air conduit, and means in said cabin-air conduit beyond said secondary heat exchanger for further cooling such air.

14. A heat regulating unit for aircraft comprising a cabin-air conduit and a separate and branched second conduit, one such branch leading towards airfoil surfaces, a secondary heat exchanger arranged in heat exchange relation between the second such branch and the cabin-air conduit, a primary heat exchanger disposed in said second conduit in advance of its branch, means in each conduit for advancing air therethrough, means to direct all or any desired portion of the air in said second conduit to either of its branches, a by-pass in said second conduit around said primary heat exchanger leading directly to said airfoil branch, and valve means in said second conduit to direct unheated air wholly through the primary heat exchanger for maximum heating thereby, or at least in part directly to said airfoil branch to reduce the temperature of air delivered thereto.

15. A heat regulating unit for aircraft comprising a cabin-air conduit and an independent and branched second conduit, one such branch leading towards airfoil surfaces, a secondary heat exchanger, arranged in heat exchange relation between the second such branch and the cabin-air conduit, a primary heat exchanger disposed in said second conduit in advance of its branch, means to advance air through said cabin-air conduit, means, including a blower in the second conduit and an expansion turbine in the cabin-air conduit operatively connected to drive said blower, for advancing air through said second conduit, and means to direct all or any desired portion of the air to either branch of said conduit, a by-pass in said second conduit around said primary heat exchanger to deliver unheated air directly to said secondary heat exchanger, valve means to direct such air either through the primary heat exchanger for heating, or directly to said secondary heat exchanger for cooling, and means to vary the ratio of cabin air delivered to said expansion turbine to be cooled thereby, relative to cabin air by-passing said expansion turbine.

16. A heat regulating unit for aircraft comprising a cabin-air conduit and an independent and branched second conduit, one such branch leading towards airfoil surfaces for anti-icing, a secondary heat exchanger arranged in heat exchange relation between the second such branch and the cabin-air conduit, a fuel-consuming prime mover having a jacket arranged in said second air conduit ahead of its branch, to constitute a primary heat exchanger for air moving therethrough, a compressor operatively connected for driving by said prime mover, and connected in said cabin-air conduit to heat and advance air therethrough, means to advance air through said second conduit, and means to control the extent of heating of cabin air by said primary heat exchanger and by said secondary heat exchanger, and the extent of cooling of cabin air after passing through said secondary heat exchanger.

17. A heat regulating unit for aircraft comprising a cabin-air conduit and an independent and branched second conduit, one such branch leading towards airfoil surfaces for anti-icing, a secondary heat exchanger arranged in heat exchange relation between the second such branch and the cabin-air conduit, means in each of said conduits, in advance of the secondary heat exchanger, for heating the air moving through the respective conduits, the aggregate heat input being sufficient to maintain a selected cabin temperature at minimum design ambient temperature, but insufficient to accomplish anti-icing under the same conditions, and means, including cooling means, to regulate the supply of heat to air moving through the respective conduits to maintain such selected cabin temperature at all normally expected ambient temperatures, and additionally to supply heated air through said second conduit at temperatures adequate to preclude ice formation through the icing temperature range.

18. A heat regulating system for aircraft comprising crossed primary and secondary conduits, a secondary heat exchanger disposed at the intersection of said conduits, a primary heat exchanger in the primary conduit, in advance of the secondary heat exchanger, of capacity to supply the maximum demand of the primary conduit, means to supply heat to the secondary conduit, in advance of the secondary heat exchanger, said means being of capacity less than the maximum demand of the secondary conduit, and means adjustable to supplement the heat supply in the secondary conduit, at temperatures less than minimum design temperature for the primary conduit, by interchange in the secondary heat exchanger from the primary conduit, or to cut out the secondary heat exchanger from the primary conduit as demand in the primary conduit approaches maximum.

19. A heat regulating unit for aircraft comprising a cabin-air conduit, a second conduit wholly separate from the cabin-air conduit, and including a delivery portion leading towards airfoil surfaces for anti-icing, said two conduits being crossed in mutual heat exchange relationship, means in each conduit, in advance of such crossing, for modifying and regulating the temperature of the air passing therethrough and delivered to said crossing, for transmission of additional heat to or abstraction of excess heat from the cabin-air flow as required to maintain a comfortable cabin temperature at ambient temperatures below or above such value, said modifying and regulating means including a compressor included in the cabin-air conduit, and a fuel-consuming prime mover arranged to heat the second conduit and operatively connected to drive said compressor, and means in said second conduit operable to by-pass said crossing and to deliver all the heated air in said second conduit towards the airfoil surfaces during ambient temperatures within the icing range, or alternatively to deliver air in said second conduit to the crossing to supplement the heat in the cabin-air conduit at ambient temperatures below the icing range.

20. A heat regulating unit for aircraft comprising a cabin-air conduit and an independent and branched second conduit, one such branch leading towards airfoil surfaces, a secondary heat exchanger arranged in heat exchange relation between the second such branch and the cabin-air conduit, a primary heat exchanger disposed in said second conduit in advance of its branch, means to advance air through said cabin-air conduit, means, including a blower in the second conduit and an expansion turbine in the cabin-air conduit operatively connected to drive said blower, for advancing air through said second conduit, and means to direct all or any desired portion of the air to either branch of said second conduit, a by-pass in said second conduit around said primary heat exchanger to deliver unheated air directly to said secondary heat exchanger, valve means to direct such air either through the primary heat exchanger for heating, or directly to said secondary heat exchanger for cooling, a by-pass in said cabin-air conduit around said expansion turbine, and valve means shiftable from a position wherein all air in said cabin-air conduit is directed through said expansion turbine, for maximum cooling, to a position wherein only a part is directed through said turbine, and the remainder is delivered directly towards the cabin, for greater heating.

ROBERT L. LINFORTH.
SIGURD DAN. HAGE.

REFERENCES CITED

The following references are of record in the file of this patent:

UNITED STATES PATENTS

| Number | Name | Date |
|---|---|---|
| 2,063,477 | Young et al. | Dec. 8, 1936 |
| 2,119,402 | Puffer | May 31, 1938 |
| 2,341,664 | Schutte | Feb. 15, 1944 |
| 2,364,458 | De N. McCollum | Dec. 5, 1944 |
| 2,370,035 | Heymann | Feb. 20, 1945 |
| 2,391,838 | Kleinhans et al. | Dec. 25, 1945 |
| 2,412,110 | Williams, Jr. | Dec. 3, 1946 |

FOREIGN PATENTS

| Number | Country | Date |
|---|---|---|
| 376,275 | Great Britain | June 27, 1932 |